US009647581B2

(12) United States Patent
Saitou et al.

(10) Patent No.: US 9,647,581 B2
(45) Date of Patent: May 9, 2017

(54) MOTOR DRIVE HAVING FUNCTION OF DETECTING FAILURE IN DYNAMIC BRAKING CIRCUIT

(71) Applicant: FANUC CORPORATION, Yamanashi (JP)

(72) Inventors: Sou Saitou, Yamanashi (JP); Tsutomu Shikagawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/006,410

(22) Filed: Jan. 26, 2016

(65) Prior Publication Data

US 2016/0226407 A1 Aug. 4, 2016

(30) Foreign Application Priority Data

Jan. 29, 2015 (JP) .................. 2015-016072

(51) Int. Cl.
*H02H 7/08* (2006.01)
*H02P 3/22* (2006.01)
*H02P 29/024* (2016.01)

(52) U.S. Cl.
CPC .............. *H02P 3/22* (2013.01); *H02P 29/024* (2013.01)

(58) Field of Classification Search
CPC ..... H02P 3/12; A61B 1/068; A61B 17/07207; A61B 17/105; A61B 17/32
See application file for complete search history.

(56) References Cited

U.S. PATENT DOCUMENTS

2015/0326151 A1* 11/2015 Ogawa .................. H02P 3/22
318/703

2016/0126874 A1* 5/2016 Hirzinger-Unterrainer ......... F02D 41/0027
290/40 B

FOREIGN PATENT DOCUMENTS

| JP | 07322663 A | 12/1995 |
| JP | 08033195 a | 2/1996 |
| JP | 2000253687 A | 9/2000 |
| JP | 2003009560 A | 1/2003 |
| JP | 2009142115 A | 6/2009 |
| JP | 2009165296 A | 7/2009 |

(Continued)

OTHER PUBLICATIONS

English Abstract for Japanese Publication No. 07-322663 A, published Dec. 8, 1995, 1 pg.

(Continued)

*Primary Examiner* — Shawki S Ismail
*Assistant Examiner* — Zoheb Imtiaz
(74) *Attorney, Agent, or Firm* — Fredrikson & Byron, P.A.

(57) ABSTRACT

A motor drive according to the present invention has a dynamic braking circuit. The motor drive includes a motor drive control circuit for applying a voltage to windings of a synchronous motor and the dynamic braking circuit for a predetermined time by switching power transistors connected to a direct current power supply, a current detection circuit for detecting a current value outputted from the power transistor, and a failure determination circuit for determining the presence or absence of a failure in the dynamic braking circuit from the current value detected by the current detection circuit and a predetermined threshold value. When the presence or absence of a failure in the dynamic braking circuit is detected, the resistance of the dynamic braking circuit is changed.

5 Claims, 7 Drawing Sheets

(56) References Cited

FOREIGN PATENT DOCUMENTS

JP         2011135750 A    7/2011
JP         2012075294 A    4/2012

OTHER PUBLICATIONS

English Abstract for Japanese Publication No. 08-033195 A, published Feb. 2, 1996, 1 pg.
English Abstract for Japanese Publication No. 2000-253687 A, published Sep. 14, 2000, 1 pg.
English Abstract for Japanese Publication No. 2003-009560 A, published Jan. 10, 2003, 1 pg.
English Abstract for Japanese Publication No. 2009-142115 A, published Jun. 25, 2009, 1 pg.
English Abstract for Japanese Publication No. 2011-135750 A, published Jul. 7, 2011, 1 pg.
English Abstract for Japanese Publication No. 2012-075294 A, published Apr. 4, 2012, 1 pg.
Untranslated Notification of Reasons for Refusal mailed by JPO, Apr. 5, 2016, 2 pages.
English machine translation of Notification of Reasons for Refusal mailed by JPO, Apr. 5, 2016, 2 pages.
Untranslated Decision to Grant a Patent mailed by JPO, Jul. 5, 2016, 3 pages.
English machine translation of Decision to Grant a Patent mailed by JPO, Jul. 5 2016, 3 pages.
English Abstract and Machine Translation for Japanese Publication No. 2009-165296 A, published Jul. 23, 2009, 16 pgs.

* cited by examiner

Variations of current when resistance R of dynamic braking circuit is low

Variations of current when resistance R of dynamic braking circuit is high

MOTOR DRIVE HAVING FUNCTION OF DETECTING FAILURE IN DYNAMIC BRAKING CIRCUIT

BACKGROUND OF THE INVENTION

1. Field of the Invention

The present invention relates to a motor drive, and in particular relates to a motor drive having a function for detecting a failure in a dynamic braking circuit.

2. Description of Related Art

Dynamic braking circuits are used, in the event of a power failure or a failure of an amplifier, to short out terminals of a motor through a resistor and quickly stop the motor by consuming rotational energy as heat. Also, there is known a motor drive that determines the presence or absence of a failure in the dynamic braking circuit (for example, Japanese Unexamined Patent Publication (Kokai) No. 2009-165296). The conventional motor drive adopts the following method for determining the presence or absence of a failure. First, a threshold value is determined in accordance with the resistance of the dynamic braking circuit and a direct current voltage. Next, while a command to open a relay of the dynamic braking circuit is outputted, power transistors are turned on for a short time so that the direct current voltage is applied to the dynamic braking circuit. At this time, a value of current flowing out of the power transistor is detected using a current detection means. By comparison between the detected current value and the threshold value, the presence or absence of a failure in the dynamic braking circuit is determined. When the relay of the dynamic braking circuit is welded, the amount of current flowing is equal to or greater than the threshold value, and therefore a welding failure is determined to be present. When the relay of the dynamic braking circuit is not welded, the amount of current flowing does not reach the threshold value, but slowly increases owing to the inductance of the motor, and therefore no welding failure is determined to be present.

FIG. 1 shows a block diagram of the conventional motor drive. A conventional motor drive 1000 includes a motor drive control circuit 1010, a failure determination circuit 1011, a power transistor unit 1003, a current detection circuit 1006, and a dynamic braking circuit 1005. A direct current power supply 1002 rectifies and converts alternating current power from an alternating current power supply (not shown) into direct current power, and outputs the direct current power to the power transistor unit 1003. The power transistor unit 1003 having power transistors A to F constitutes an inverter that converts the rectified direct current power into three-phase alternating current power to drive a motor 1004. The motor 1004 is provided with resistors $r_u$, $r_v$, and $r_w$, and inductances $L_u$, $L_v$, and $L_w$.

The dynamic braking circuit 1005 is connected to wiring between the power transistor unit 1003 and the motor 1004. The dynamic braking circuit 1005 is provided with resistors $R_u$, $R_v$, and $R_w$. To make the resistors consume electric power generated by the motor 1004, switches $S_1$ and $S_2$, i.e. contacts in the relay are closed.

A method for detecting a failure in the conventional dynamic braking circuit, as shown in FIG. 1, is as follows. First, the motor drive control circuit 1010 outputs a dynamic braking circuit control signal to the failure determination circuit 1011. The failure determination circuit 1011 outputs a power transistor control signal to the power transistors A to F of the power transistor unit 1003, to control the actuation and stop of the motor 1004. The current detection circuit 1006 detects a current flowing from the power transistor unit 1003 into the motor 1004. The current detection circuit 1006 performs a digital-to-analog conversion of a detected current value, and outputs the converted current value to the failure determination circuit 1011.

The failure determination circuit 1011 obtains the dynamic braking circuit control signal outputted from the motor drive control circuit 1010 and the current value outputted from the current detection circuit 1006, to detect, from these signals, a failure in the dynamic braking circuit 1005 such as welding of the contact in the relay, a malfunction of the contact, a break in the resistor, or a disconnection of a connection cable.

The failure determination circuit 1011 determines the presence or absence of the failure in the dynamic braking circuit by comparison of a current value I detected by the current detection circuit 1006 with a threshold value $I_{TH}$. In FIG. 1, if the power transistors A and F are turned on while the other transistors are turned off, the current value I ($=I_u$) is represented by the following equation.

$$I \approx V_{DC}/2L \times t + V_{DC}/2R$$

Here, $V_{DC}$ represents the voltage of the direct current power supply 1002, 2L ($=L_u+L_w$) represents the inductance of the motor 1004, t represents time, and 2R ($=R_u+R_w$) represents the resistance of the dynamic braking circuit 1005. Also, $V_{DC}/2L \times t$ represents a current flowing through the motor 1004, and $V_{DC}/2R$ represents a current flowing through the dynamic braking circuit 1005.

Using the above equation, the method for detecting the presence or absence of a failure in the relay of the dynamic braking circuit will be described. When the current I ($I_u$, $I_v$, or $I_w$) flowing through the power transistors A to F is higher than the threshold value, even though a command to disconnect the dynamic braking circuit 1005 from windings $L_u$, $L_v$, and $L_w$ of the motor 1004 is issued, the contact of the relay that establishes connection with the dynamic braking circuit 1005 is determined to be welded and broken.

When the presence or absence of a failure (welding) in the relay of the dynamic braking circuit 1005 is detected, a failure detection command is issued by which, while the switches $S_1$ and $S_2$ in the relay of the dynamic braking circuit 1005 are opened, the power transistors are turned on to apply the direct current voltage $V_{DC}$ to the dynamic braking circuit 1005 for a short time Δt.

FIG. 2 shows variations of the current I with time with and without the presence of welding in the relay, when the resistance R of the dynamic braking circuit is low. When the relay of the dynamic braking circuit 1005 is welded, the direct current voltage $V_{DC}$ is applied to the dynamic braking circuit 1005 and therefore the current detection circuit 1006 detects the current I exceeding the threshold value $I_{TH}$ within the time Δt, as shown by a curve A in FIG. 2, so that welding is determined to be present. On the other hand, when the relay of the dynamic braking circuit 1005 is not welded but opened normally, the direct current voltage $V_{DC}$ is applied to the dynamic braking circuit 1005, but as shown by curve B in FIG. 2, the current I does not exceed the threshold value $I_{TH}$ within the time Δt, so that no welding is determined to be present. As described above, when the resistance R of the dynamic braking circuit 1005 is low, the threshold value $I_{TH}$ can be set at a high value, and thus the presence or absence of a welding in the relay of the dynamic braking circuit 1005 is determined normally.

Also as described above, the threshold value $I_{TH}$ depends on the resistance R of the dynamic braking circuit 1005 and the direct current voltage $V_{DC}$, and has a condition indicated by the following equation (1).

$$V_{DC}/2R > I_{TH} \quad (1)$$

When the resistance R of the dynamic braking circuit 1005 is high, the threshold value $I_{TH}$ has to be lowered. FIG. 3 shows variations of the current I with time with and without the presence of welding in the relay, when the resistance R of the dynamic braking circuit 1005 is high. When the relay of the dynamic braking circuit 1005 is welded, the current detection circuit 1006 detects the current I exceeding the threshold value $I_{TH}$ within the time Δt, as shown by curve C in FIG. 3, so that welding is determined to be present. However, when the relay of the dynamic braking circuit 1005 is not welded, if the threshold value $I_{TH}$ is too low, even a current I that slowly increases owing to the inductance of the motor 1004 upon application of the direct current voltage $V_{DC}$ to the motor 1004 by turning on the power transistors will exceed the threshold value $I_{TH}$ within the time Δt as shown by curve D in FIG. 3. Since the threshold value $I_{TH}$ has to be low, welding is determined to be present, though in actual fact there is no welding.

SUMMARY OF THE INVENTION

In a conventional motor drive, when the resistance of the dynamic braking circuit is high, the threshold value has to be lowered. However, if the threshold value is too low, even a current that slowly increases owing to the inductance of the motor will exceed the threshold value and welding is determined to be present, though there is in fact no welding in the relay of the dynamic braking circuit.

A motor drive according to one embodiment of the present invention has a dynamic braking circuit for generating a deceleration torque by dynamic braking of a synchronous motor, when the excitation of the synchronous motor is interrupted. The motor drive includes a motor drive control circuit for applying a voltage to a winding of the synchronous motor and the dynamic braking circuit for a predetermined time by switching a power transistor connected to a direct current power supply, a current detection circuit for detecting a current value outputted from the power transistor, and a failure determination circuit for determining the presence or absence of a failure in the dynamic braking circuit from the current value detected by the current detection circuit and a predetermined threshold value. When the presence or absence of a failure in the dynamic braking circuit is detected, the resistance of the dynamic braking circuit is changed.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A motor drive according to the present invention will be described below with reference to the drawings.

First Embodiment

Figure 1:
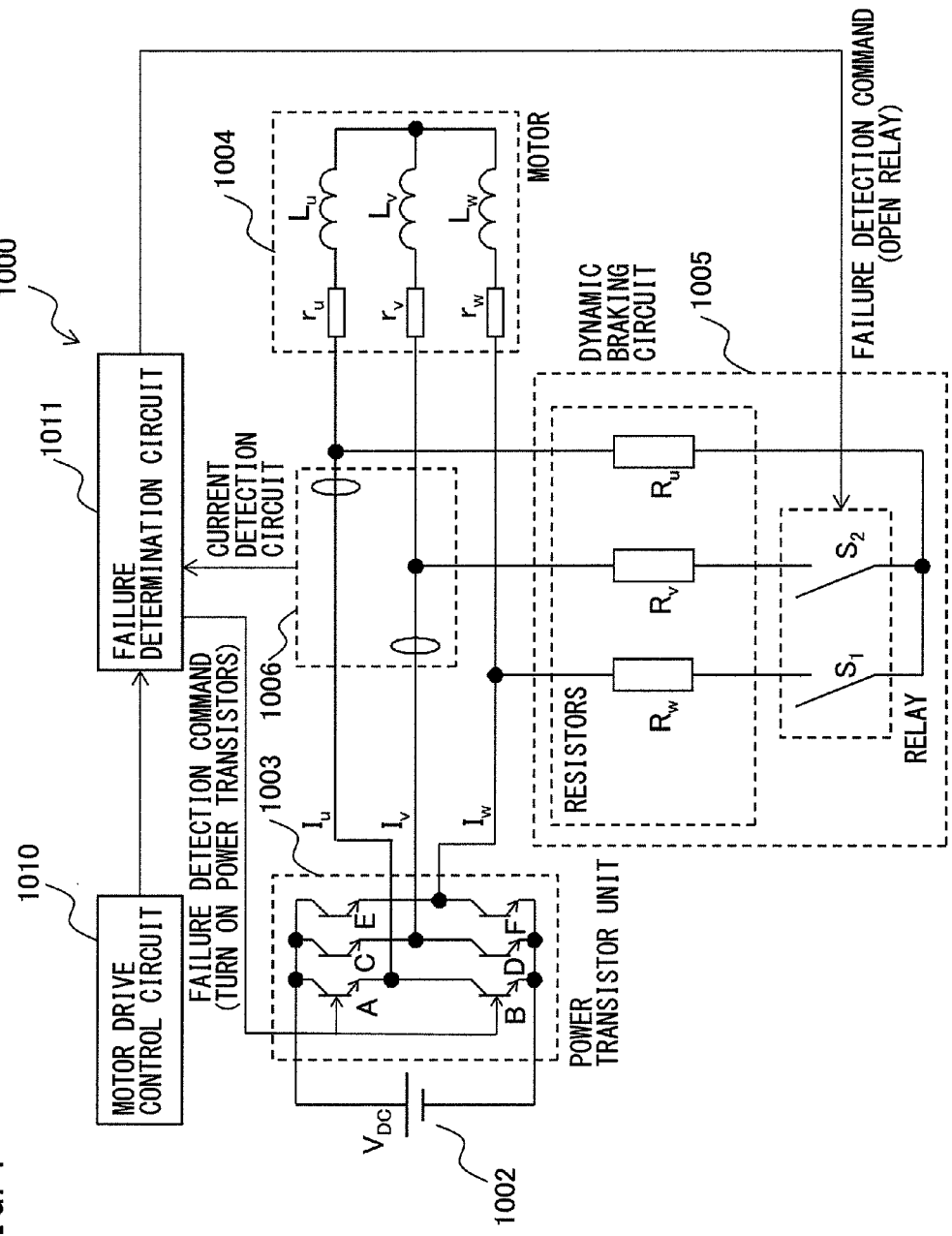
FIG. 1 is a block diagram of a conventional motor drive having the function of detecting a failure in a dynamic braking circuit.
Figure 2:
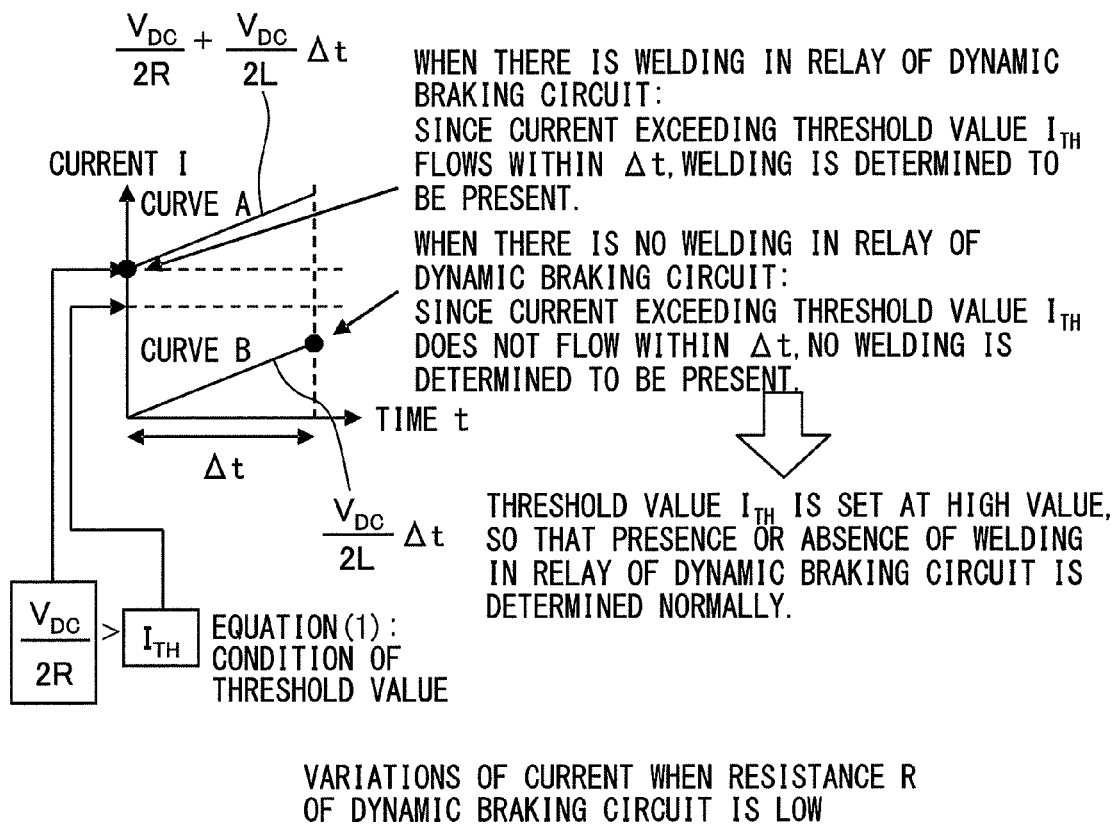
FIG. 2 is a graph showing the relationship between a current flowing through the dynamic braking circuit and a threshold value, when the resistance of the dynamic braking circuit is low.
Figure 3:
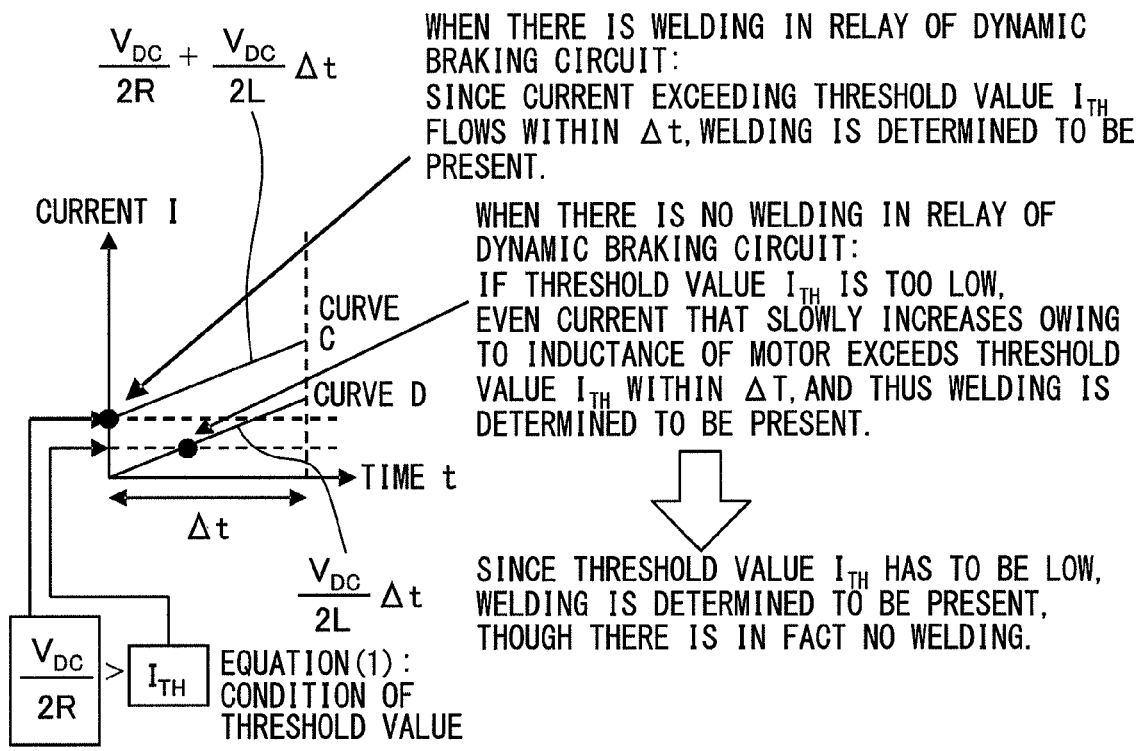
FIG. 3 is a graph showing the relationship between a current flowing through the dynamic braking circuit and a threshold value, when the resistance of the dynamic braking circuit is high.
Figure 4:
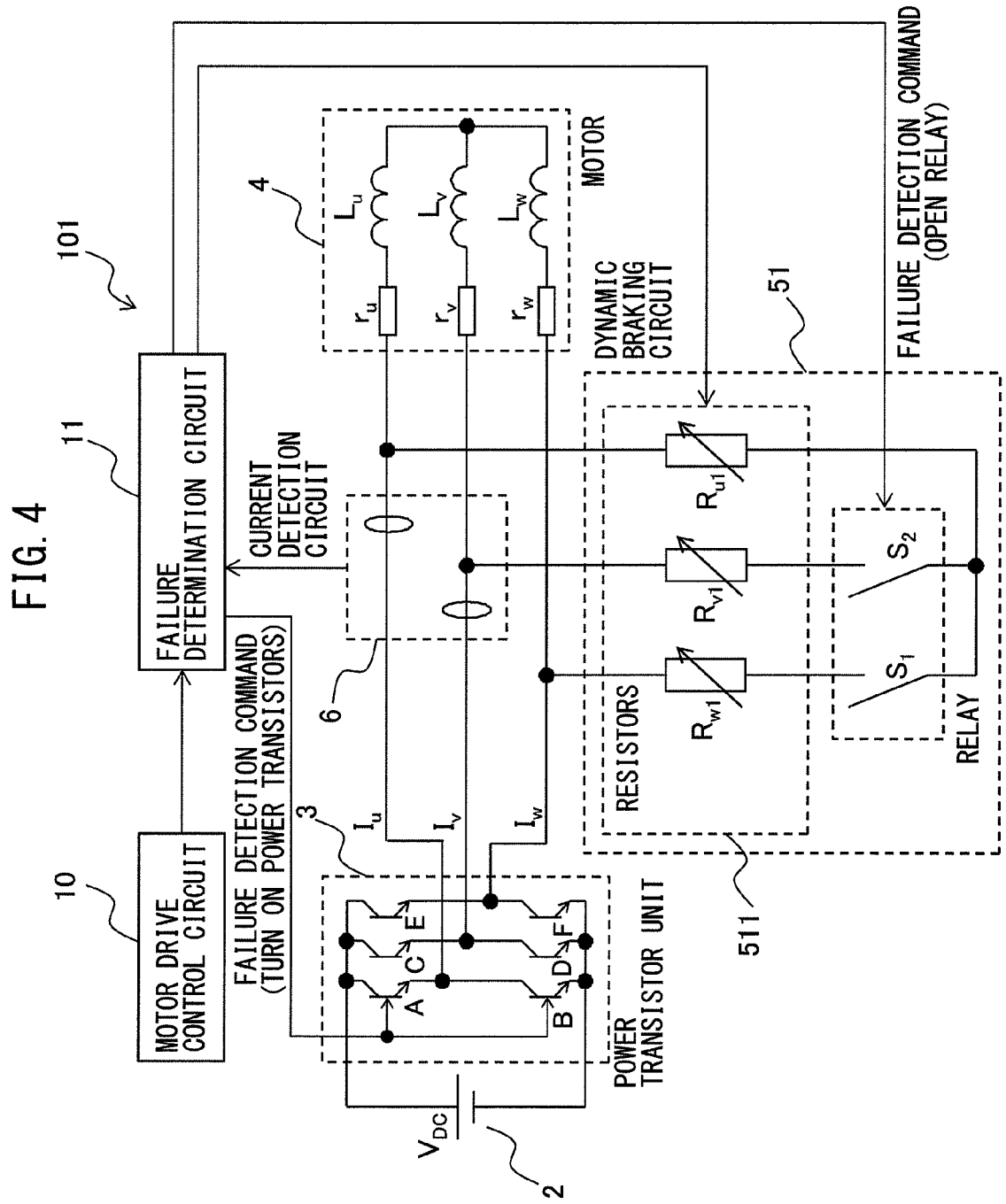
FIG. 4 is a block diagram of a motor drive having the function of detecting a failure in a dynamic braking circuit according to a first embodiment of the present invention.

A motor drive according to a first embodiment of the present invention will be described with reference to the drawings. FIG. 4 is a block diagram of the motor drive according to the first embodiment of the present invention. A motor drive 101 according to the first embodiment of the present invention has a dynamic braking circuit 51 for generating a deceleration torque by dynamic braking of a synchronous motor 4, when the excitation of the synchronous motor 4 is interrupted. The motor drive 101 includes a motor drive control circuit 10 for applying a voltage to windings ($L_u$, $L_v$, and $L_w$) of the synchronous motor 4 and the dynamic braking circuit 51 for a predetermined time by switching power transistors A to F of a power transistor unit 3 connected to a direct current power supply 2; a current detection circuit 6 for detecting a current value outputted from the power transistor; and a failure determination circuit 11 for determining the presence or absence of a failure in the dynamic braking circuit 51 from the current value detected by the current detection circuit 6 and a predetermined threshold value. When the presence or absence of a failure in the dynamic braking circuit 51 is detected, the resistance of the dynamic braking circuit 51 is changed.

Conventional motor drives have a problem that when the resistance of a dynamic braking circuit is high, if a threshold value is too low, even a current that slowly increases owing to the inductance of a motor will exceed the threshold value. To solve this problem, in the motor drive according to the first embodiment of the present invention, the resistance R of the dynamic braking circuit 51 is changed to a lower resistance value R2, only during a time period (short time it) in which, upon an issue of a failure detection command, the power transistors are turned on and a direct current voltage $V_{DC}$ is applied to the dynamic braking circuit 51. By changing the resistance R of the dynamic braking circuit 51 to the lower resistance value R2, an upper limit of a threshold value $I_{TH}$ is changed to $V_{DC}/(2 \times R2)$, which is higher than $V_{DC}/(2R)$, and thus the threshold value $I_{TH}$ can be set at a higher value.

In the motor drive according to the first embodiment of the present invention, the dynamic braking circuit 51 includes variable resistors $R_{u1}$, $R_{v1}$, and $R_{w1}$ to change the resistance of the dynamic braking circuit 51. FIG. 4 illustrates a case where all of U-phase, V-phase, and W-phase resistors 511 in the dynamic braking circuit 51 are replaced with the variable resistors $R_{u1}$, $R_{v1}$, and $R_{w1}$, by way of example, but this is not necessarily required. Only one of the three resistors may be replaced with the variable resistor, or two of the three resistors may be replaced with the variable resistors, instead.

Furthermore, when detecting a failure in the dynamic braking circuit 51, the threshold value $I_{TH}$ may be changed in accordance with the resistances $R_{u1}$, $R_{v1}$, and $R_{w1}$ of the dynamic braking circuit 51 or the inductances $L_u$, $L_v$, and $L_w$ of the synchronous motor 4.

Figure 5:
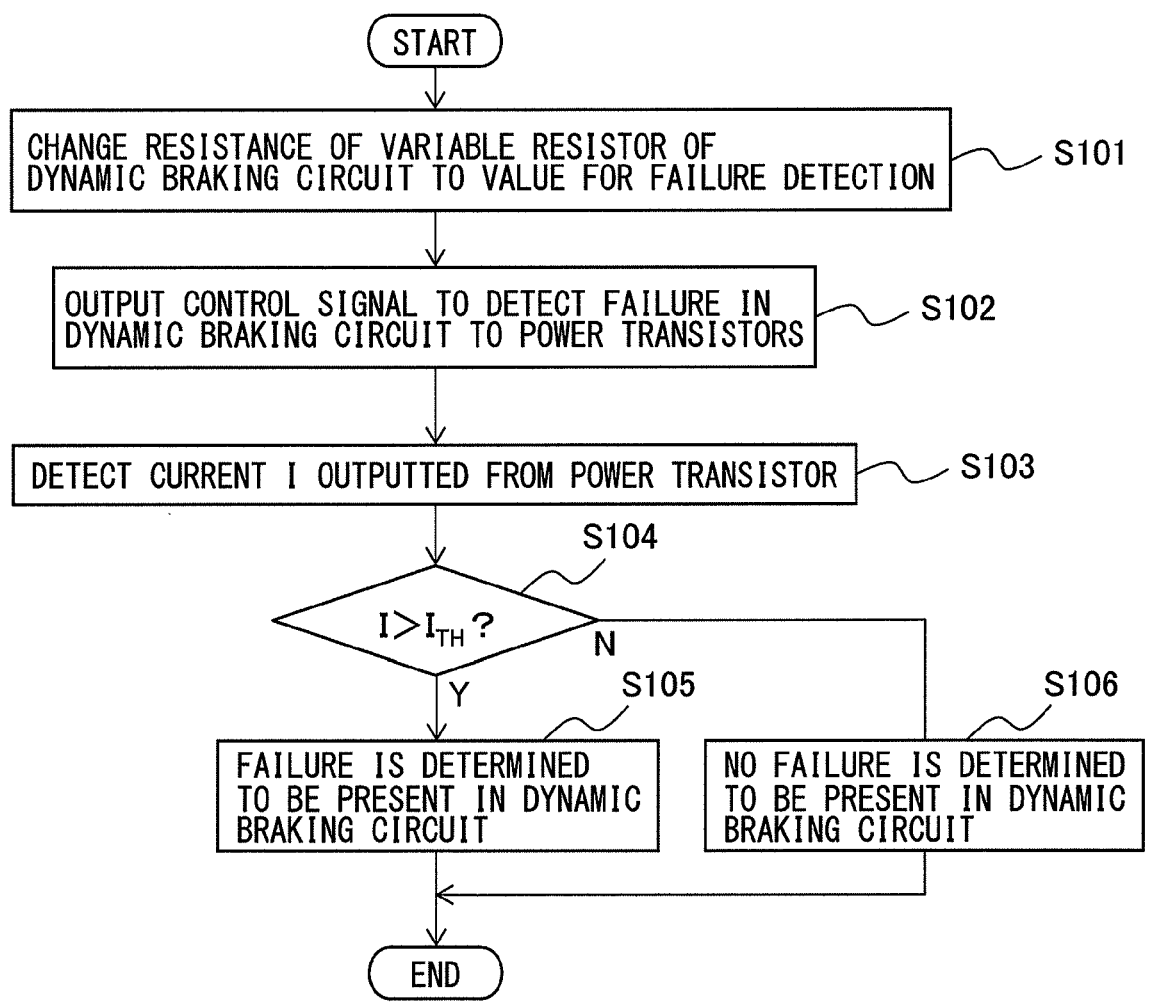
FIG. 5 is a flowchart for explaining a procedure for the operation of the dynamic braking circuit according to the first embodiment of the present invention.

Next, a procedure for the operation of detecting a failure in the dynamic braking circuit will be described in the motor drive according to the first embodiment of the present invention. FIG. 5 is a flowchart for explaining the procedure for the operation of the dynamic braking circuit according to the first embodiment of the present invention. A procedure for detecting the presence or absence of welding in a relay will be described here.

First, in step S101, the failure determination circuit 11 makes the resistance of the variable resistor of the dynamic braking circuit 51 change to a value for failure detection. More specifically, when R represents the resistance of the dynamic braking circuit 51 during normal operation, the resistance of the variable resistor is changed to R2, which is less than R.

Next, in step S102, the failure determination circuit 11 outputs a control signal to detect a failure in the dynamic braking circuit 51 to the power transistors A to F. For example, when detecting the conditions of the V-phase and W-phase resistors and the relay of the dynamic braking circuit 51, the power transistors C and F are turned on while the other power transistors are turned off. At the same time, the failure determination circuit 11 sends the failure detection command that is a signal to open the switches $S_1$ and $S_2$ of the relay to the dynamic braking circuit 51.

Next, in step S103, the current detection circuit 6 detects a current I ($I_v$ and $I_w$) outputted from the power transistor. A detected current value is sent from the current detection circuit 6 to the failure determination circuit 11.

Next, in step S104, the failure determination circuit 11 determines whether or not the detected current value I exceeds the threshold value $I_{TH}$. When the current value I exceeds the threshold value $I_{TH}$, in step S105, it is determined that a failure is present in the dynamic braking circuit 51.

On the other hand, when the current value I is equal to or less than the threshold value $I_{TH}$, in step S106, it is determined that no failure is present in the dynamic braking circuit 51.

According to the motor drive of the first embodiment of the present invention, as described above, by changing the resistance R of the dynamic braking circuit to the lower resistance value R2 using the variable resistor, the current threshold value $I_{TH}$ to determine a failure in the relay of the dynamic braking circuit can be set at a high value, thus enabling the motor drive to precisely determine the presence or absence of a failure in the relay.

Second Embodiment

Figure 6:
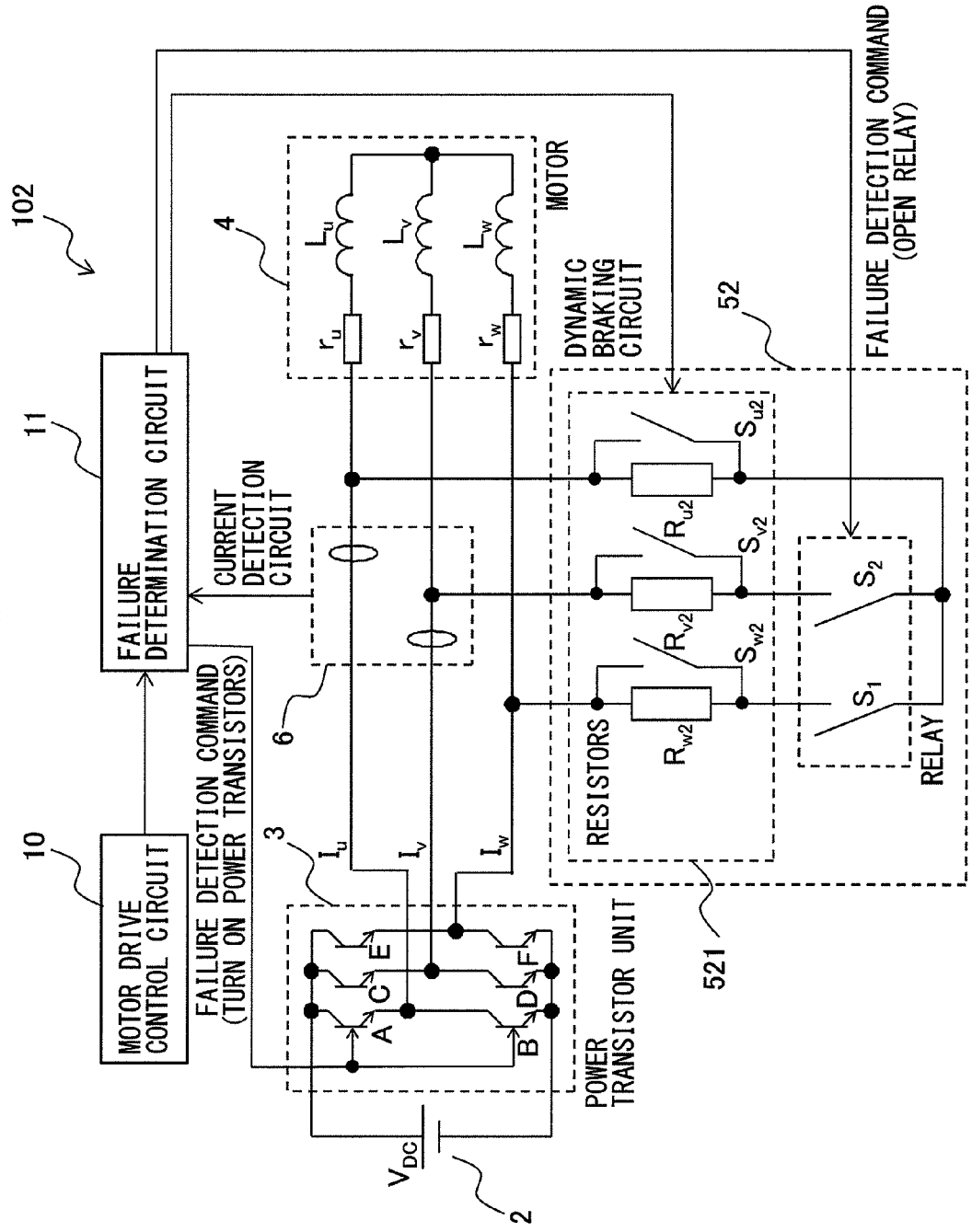
FIG. 6 is a block diagram of a motor drive having the function of detecting a failure in a dynamic braking circuit according to a second embodiment of the present invention.

Next, a motor drive according to a second embodiment of the present invention will be described with reference to the drawings. FIG. 6 is a block diagram of the motor drive according to the second embodiment of the present invention. A motor drive 102 according to the second embodiment of the present invention includes shorting switches $S_{u2}$, $S_{v2}$, and $S_{w2}$ provided in parallel with resistors 521 ($R_{u2}$, $R_{v2}$, and $R_{w2}$) of a dynamic braking circuit 52 in order to cause the resistors 521 ($R_{u2}$, $R_{v2}$, and $R_{w2}$) of the dynamic braking circuit 52 to short out. The other configurations of the motor drive 102 according to the second embodiment are the same as those of the motor drive 101 according to the first embodiment, and thus detailed description thereof will be omitted.

According to the motor drive of the second embodiment, when the presence or absence of a failure in the dynamic braking circuit 52 is detected, the resistors 521 ($R_{u2}$, $R_{v2}$, and $R_{w2}$) can be shorted out, and thus the resistors 521 of the dynamic braking circuit 52 can have reduced resistances. As a result, since the current threshold value $I_{TH}$ to determine a failure in a relay of the dynamic braking circuit 52 can be set at a high value, it is possible to precisely determine the presence or absence of a failure in the relay.

It should be noted that in an example of the motor drive 102 according to the second embodiment shown in FIG. 6, all of the resistors $R_{u2}$, $R_{v2}$, and $R_{w2}$ are provided with the shorting switches $S_{u2}$, $S_{v2}$, and $S_{w2}$, respectively, connected in parallel, but is not limited to such an example. Instead, only one of the resistors $R_{u2}$, $R_{v2}$, and $R_{w2}$ may be provided with the shorting switch connected in parallel, or two of the resistors $R_{u2}$, $R_{v2}$, and $R_{w2}$ may be each provided with the shorting switch connected in parallel.

Furthermore, when the presence or absence of a failure in the dynamic braking circuit 52 is detected, the threshold value $I_{TH}$ may be changed in accordance with the resistances $R_{u2}$, $R_{v2}$, and $R_{w2}$ of the dynamic braking circuit 52 or the inductances $L_u$, $L_v$, and $L_w$ of the synchronous motor 4.

Third Embodiment

Figure 7:
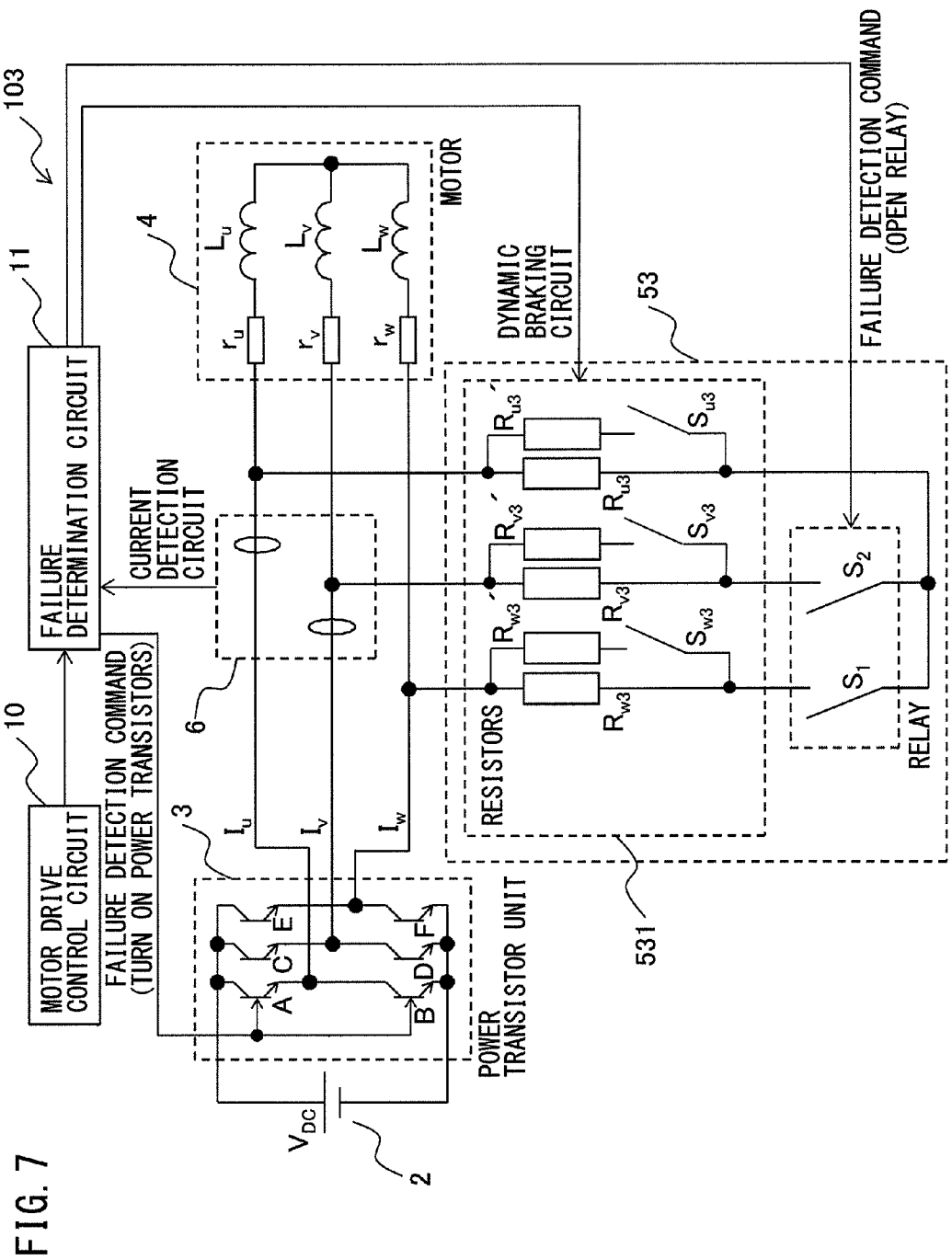
FIG. 7 is a block diagram of a motor drive having the function of detecting a failure in a dynamic braking circuit according to a third embodiment of the present invention.

Next, a motor drive according to a third embodiment of the present invention will be described with reference to the drawings. FIG. 7 is a block diagram of the motor drive according to the third embodiment of the present invention. A motor drive 103 according to the present invention includes additional resistors $R_{u3}'$, $R_{v3}'$, and $R_{w3}'$ that are connected in parallel with resistors 531 ($R_{u3}$, $R_{v3}$, and $R_{w3}$) of a dynamic braking circuit 53, respectively, in order to change the resistance of the dynamic braking circuit 53, and switches $S_{u3}$, $S_{v3}$, and $S_{w3}$ for switching the connection and disconnection of the additional resistors. The other configurations of the motor drive 103 according to the third embodiment are the same as those of the motor drive 101 according to the first embodiment, and thus detailed description thereof will be omitted.

According to the motor drive of the third embodiment, when the presence or absence of a failure in the dynamic braking circuit 53 is detected, the resistors 531 ($R_{u3}$, $R_{v3}$, and $R_{w3}$) can become parallel resistors with the additional resistors $R_{u3}'$, $R_{v3}'$, and $R_{w3}'$, respectively, and thus the resistors 531 of the dynamic braking circuit 53 can have reduced resistances. As a result, since the current threshold value $I_{TH}$ to determine a failure in a relay of the dynamic braking circuit 53 can be set at a high value, it is possible to precisely determine the presence or absence of a failure in the relay.

It should be noted that in an example of the motor drive 103 according to the third embodiment shown in FIG. 7, all of the resistors $R_{u3}$, $R_{v3}$, and $R_{w3}$ are provided with the additional resistors $R_{u3}'$, $R_{v3}'$, and $R_{w3}'$ and the switches $S_{u3}$, $S_{v3}$, and $S_{w3}$, respectively, connected in parallel, but is not limited to such an example. Instead, only one of the resistors $R_{u3}$, $R_{v3}$, and $R_{w3}$ may be provided with the additional resistance and the switch connected in parallel, or two of the resistors $R_{u3}$, $R_{v3}$, and $R_{w3}$ may be each provided with the additional resistance and the switch connected in parallel.

Furthermore, when the presence or absence of a failure in the dynamic braking circuit 53 is detected, the threshold value $I_{TH}$ may be changed in accordance with the resistances $R_{u3}$, $R_{v3}$, and $R_{w3}$ of the dynamic braking circuit 53 or the inductances $L_u$, $L_v$, and $L_w$ of the synchronous motor 4.

According to the motor drive of the embodiments of the present invention, as described above, it is possible to detect a failure in the dynamic braking circuit, even when the dynamic braking circuit has a high resistance.

What is claimed is:

1. A motor drive having a dynamic braking circuit for generating a deceleration torque by dynamic braking of a synchronous motor, when the excitation of the synchronous motor is interrupted, the motor drive comprising:
    a motor drive control circuit configured to apply a voltage to a winding of the synchronous motor and the dynamic braking circuit for a predetermined time by switching a power transistor connected to a direct current power supply;
    a current detection circuit configured to detect a current value outputted from the power transistor; and
    a failure determination circuit configured to determine the presence or absence of a failure in the dynamic braking circuit from the current value detected by the current detection circuit and a predetermined threshold value,
    wherein when the presence or absence of a failure in the dynamic braking circuit is detected, the resistance of the dynamic braking circuit is changed to a resistance which is less than a resistance during normal operation.

2. The motor drive according to claim 1, wherein the dynamic braking circuit includes a variable resistor to change the resistance of the dynamic braking circuit.

3. The motor drive according to claim 1, further comprising a shorting switch connected in parallel with a resistor of the dynamic braking circuit, in order to cause the resistor of the dynamic braking circuit to short out.

4. The motor drive according to claim 1, further comprising an additional resistor connected in parallel with a resistor of the dynamic braking circuit and a switch for switching the connection and disconnection of the additional resistor, in order to change the resistance of the dynamic braking circuit.

5. The motor drive according to claim 1, wherein when the presence or absence of the failure in the dynamic braking circuit is detected, the threshold value is changed in accordance with the resistance of the dynamic braking circuit or the inductance of the synchronous motor.

* * * * *